July 12, 1960

G. M. WANINGER 2,945,201

MULTI-POLAR TERMINAL CONNECTION FOR ELECTRIC CONDUCTORS

Filed Feb. 18, 1955

INVENTOR.
Gilbert M. Waninger

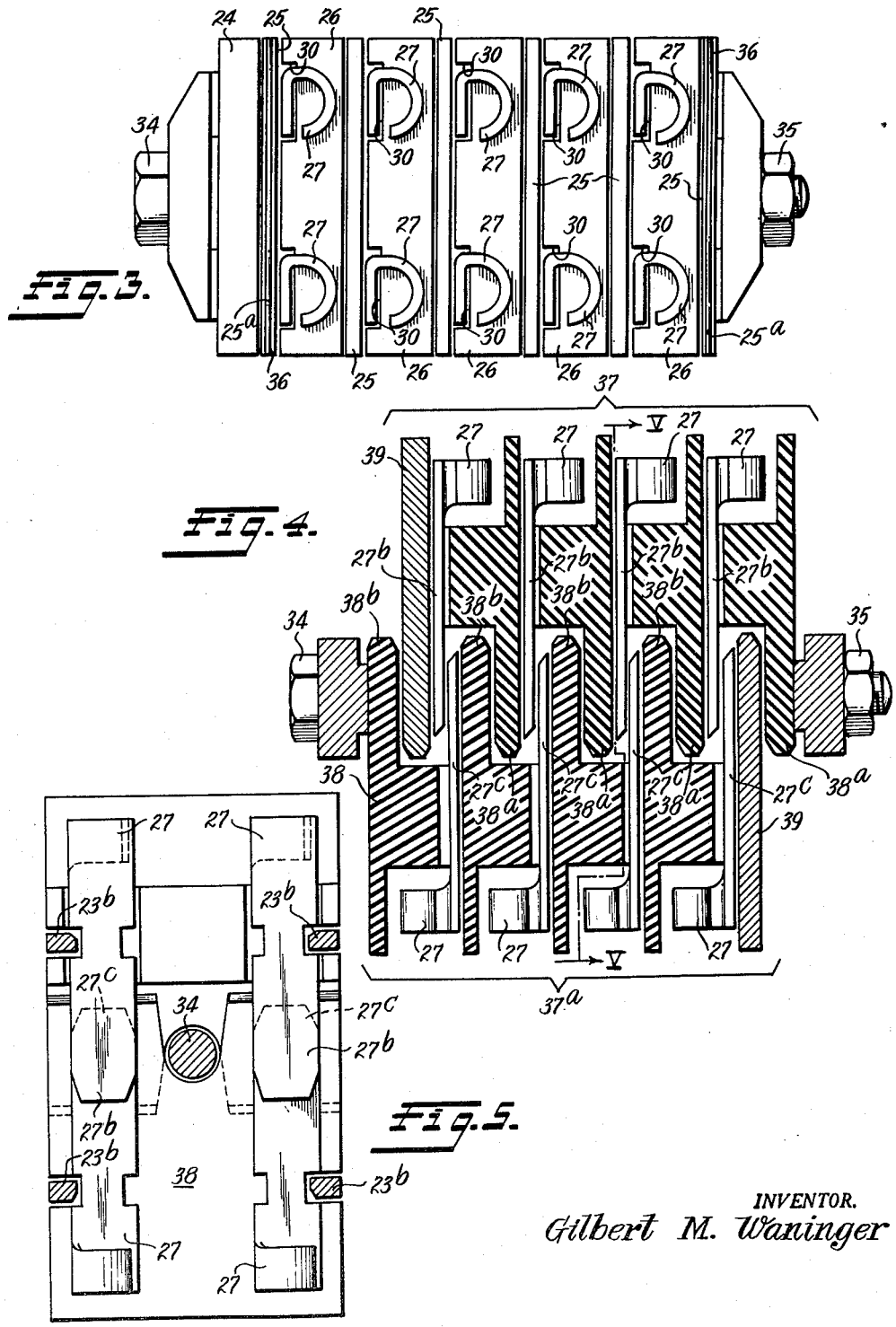

INVENTOR.
*Gilbert M. Waninger*

United States Patent Office 2,945,201
Patented July 12, 1960

2,945,201
MULTI-POLAR TERMINAL CONNECTION FOR ELECTRIC CONDUCTORS

Gilbert M. Waninger, Siegen, Westphalia, Germany, assignor to Kabelschlepp G.m.b.H., Siegen, Westphalia, Germany Filed Feb. 18, 1955, Ser. No. 489,139

Claims priority, application Germany Feb. 20, 1954

5 Claims. (Cl. 339—49)

The present invention relates to terminal connections and, more particularly, to multi-polar terminal connections for electric conductors.

The connection of electric circuits is effected mostly by means of terminal strips and the like if such connections are not or only seldom disconnected during operation, whereas connections which are frequently to be disconnected are effected by means of plug-socket connections or the like. When a greater number of conductors are involved which convey higher currents but have to be disconnected from time to time as for instance in connection with installing, dismantling, repairing or switching over of machines, switches or the like as is for instance frequently the case in the motor car industry or in the machine tool industry, numerous terminal connections have to be disconnected individually and have to be restored individually. This work requires considerable time and careful attention if faulty connections are to be avoided. Disconnectable plug-socket connections have the drawback that the contact pressure is not properly controlled so that this type of connections is not employed any longer for high currents.

It is, therefore, an object of the present invention to provide terminal connections for electric circuits which will overcome the above mentioned drawbacks.

It is another object of this invention to provide terminal connections for electric circuits which will combine the advantageous properties of terminal strips and plug-socket connections while eliminating the drawbacks thereof.

It is still another object of this invention to provide a multi-polar terminal connection for electric circuits which will make it possible within a short time and without the danger of effecting faulty connections simultaneously to disconnect and connect a number of electric conductors in a voltage-free condition while assuring a proper and safe current passage between the respective terminals.

These and other objects and advantages of the invention will appear more clearly from the following specification in connection with the accompanying drawings in which:

Fig. 3 is a top view of the arrangement of Fig. 1.

Fig. 4 is a longitudinal section through a modified terminal strip connection with eight poles.

Fig. 5 is a section taken along the line V—V of Fig. 4.

General arrangement

The primary feature of the present invention consists in that individual contact members connected to the respective conductors are arranged between movable insulating members with such a play that the said individual contact members can be connected practically without any mechanical resistance while, however, all contact members can be pressed together by means of a single clamping device. The insulating members may consist of heat resistant insulating plastic material which is permanently hardenable. Thermoplastic material is not suitable for the insulating members of the present invention.

The parts may for instance be arranged one alongside the other, but they may also form the mantle of a cylinder. In both instances one row and multiple row contact groups may be formed. It is also possible to mount the contact members in two casing portions which are simultaneously held together by the clamping member, for instance by means of caps or the like.

According to a further feature of the invention, locking means or the like may be provided in order to arrest the inserted contact members in their respective positions so that following the first installation they cannot by themselves drop out anymore.

Structural arrangement

Figure 1:
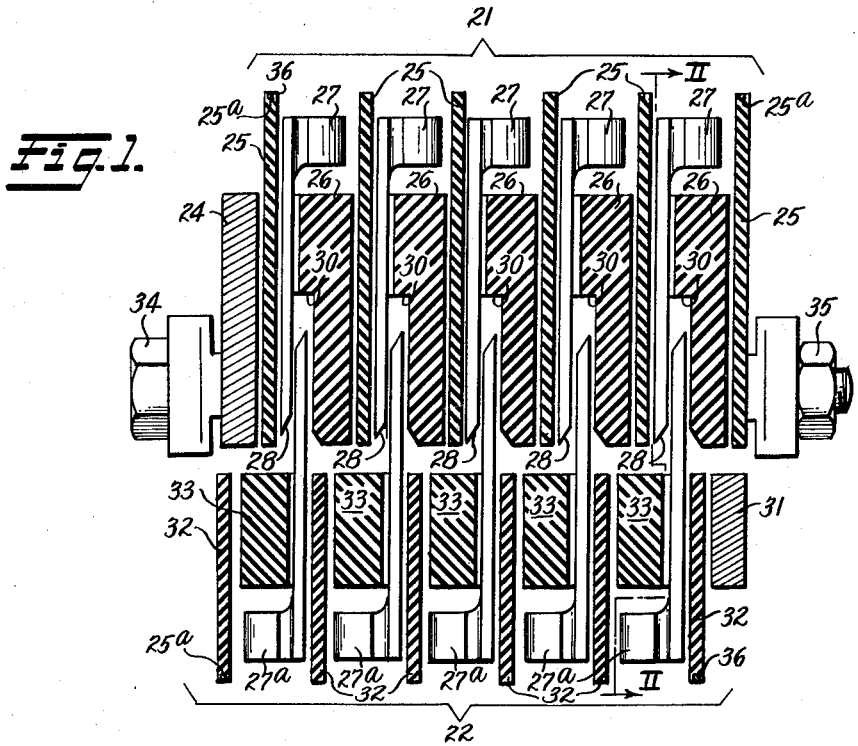
Fig. 1 represents a longitudinal section through a ten-polar two-row terminal strip, the section being taken along the line I—I of Fig. 2.
Figure 2:
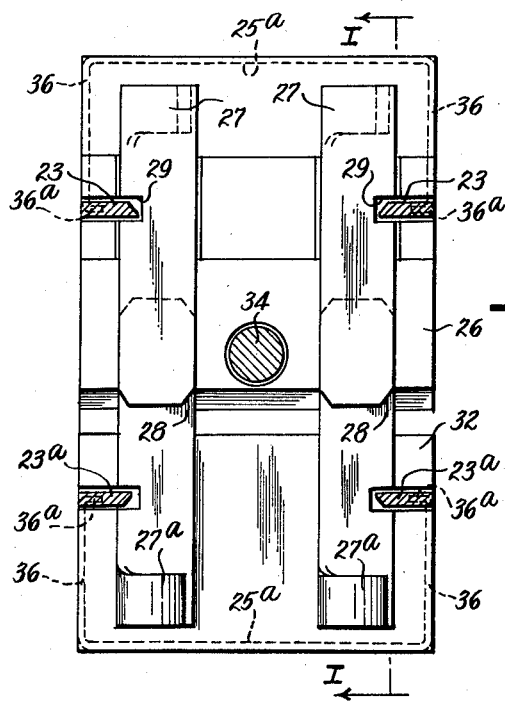
Fig. 2 is a cross section through the connection of Fig. 1 taken along the line II—II of Fig. 1.

Referring now to the drawings in detail, and Figs. 1 to 3 thereof in particular, the embodiment of the invention shown in Figs. 1 to 3 illustrates a multi-polar terminal strip connection. This connection consists primarily of a socket part 21 and a plug part 22. The socket part 21 is composed of individual members which are held together by locking strips 23, while in addition to an end plate 24 there is provided a number of large separating plates 25. In the specific example of Fig. 1 six separating plates 25 are being provided which serve as insulating plates. Between said separating plates 25 there are provided five large carrier plates 26 which are designed as insulating members. Contact members 27 to be connected with conductors (not shown in the drawings) are inserted in the carrier plates 26. The contact members 27 are provided with a chamfer or inclined surface 28 which chamfers or inclined surfaces 28 are adapted to lift the locking strips 23 against spring pressure until the locking strips 23 engage the recesses 29 of the contact members 27 and thus secure the latter against longitudinal displacement. The contact members 27 are so arranged and dimensioned as to be able freely to move in the carrier plates 26 and freely laterally to move with sufficient play on the locking strips 23 due to the recesses 29 so that the contact members 27 can easily be inserted and can adjust themselves in conformity with the contact pressure.

The carrier plates 26 are provided with grooves 30 into which the contact members 27a of a plug part 22 can be inserted. This plug part 22 is designed in almost the same manner as the socket part 21. Practically the only difference consists in that the individual members are shorter with the exception of the contact strips or members 27a and the locking strips 23a. Accordingly, the shorter end members 31 and the shorter separating plates 32 as well as the carrier plates 33 are in repeated succession mounted on the locking strips 23a as is clearly visible from Fig. 2. The contact members 27a are similar to the contact members 27 of the socket part 21 inserted between the insulating members or carrier plates 33 and separating plates 32.

In order to establish the terminal strip connection, the plug part 22 is inserted into the socket part 21 so that the contact members 27a of the plug part 22 respectively enter between the contact members 27 of the socket part 21 and the grooves 30 of the large carrier plates 26. In order to bring about the contact pressure, a nut 35 is tightened which is mounted on a screw bolt 34 extending at least approximately through a central portion of the insulating members and holding the same together. The produced tightening force of the nut 35 presses the members of the socket part 21 and the inserted protruding ends of the contact members 27a of the plug part 22 together so that the contact members 27 and 27a are pressed against each other whereby the proper contact pressure required for the current passage is obtained.

In this way the contact connection of all conductors leading to the socket part 21 and conductors leaving the plug part 22 is established. The end separating plates 25 are provided with circumferential grooves 25a into which are inserted U-shaped bent spring yokes 36 the inwardly angled ends 36a of which engage corresponding recesses in the locking strips 23.

The arrangement shown in Figs. 1 to 3 is particularly suitable for a quick connection of flexible wires or cables, since the contacts of the socket part 21 which is under tension is protected against contact and can be especially used in connection with conductors which have to be placed inside of machine tools so that a separate protective casing is not required.

The embodiment shown in Figs. 4 and 5 represents a particularly simple, advantageous and economical construction. According to this embodiment, the members of the socket part 37a and plug part 37 are completely identical and uniform. Such quick terminal connection is composed of such a socket and plug part, the conductors leading to one of said parts and leaving the other part. The parts 37a and 37 correspond substantially to the socket part 21 and plug part 22 of Figs. 1 to 3. The carrier plates 38 corresponding to the number of contacts are mouned on the locking strips 23b. The carrier plates 38 have those parts which face each other, namely the parts 38a, 38b reduced in strength to less than half of the thickness of the plates so that they can engage each other in a comb-like manner while leaving sufficient space between themselves for receiving the contact members 27b, 27c and allow sufficient play prior to tightening the nut 35 so as to allow an easy introducing of the contact members from both sides. This simplified embodiment does not require a subdivision of the insulating members into separating and carrying plates. In this instance only the carrier plates are employed as insulating members. The end plates 39 serve as closure plates. The contact members 27b, 27c are inserted in the same manner as described in connection with Figs. 1 to 3. The clamping screw 34 with the nut 35 extends through the bores in each of the carrier plates 38 at both sides of the feed lines and lead-off lines so that the two parts i.e. plug parts and socket parts, cannot be taken apart or moved into each other in closed position but will be united after effected connection with each other. The establishment of contact is brought about by tightening the nut 35. The establishment of the required contact pressure is effected in conformity with the same principle as with the embodiment of Figs. 1 to 3.

The embodiments of Figs. 1 to 5 show double row arrangements of contact members 27, 27a; 27b, 27c. The clamping screw 34 has its shaft insulated, for instance by a rubber hose placed therearound.

Figure 6:
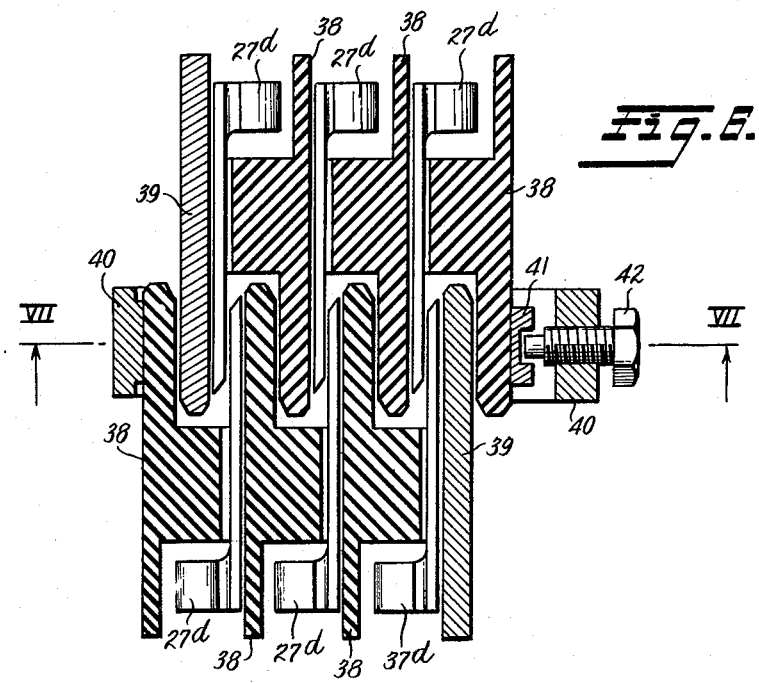
Fig. 6 represents a longitudinal section through a three-polar terminal strip connection in a pressure frame.
Figure 7:
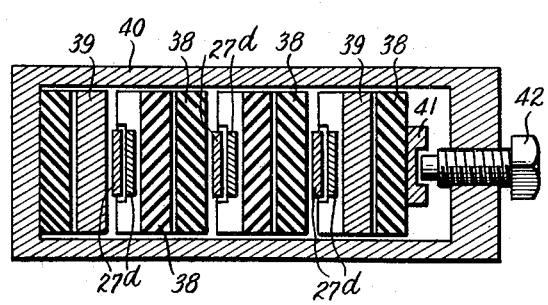
Fig. 7 represents a section through Fig. 6 taken along the line VII—VII thereof.

Referring now to Figs. 6 and 7, the embodiments shown therein illustrate a one-row contact strip terminal arrangement. The construction substantially corresponds to that of the embodiments described above. The contact pressure, however, is brought about by means of the pressure screw 42 through the intervention of a clamping frame 40 and a pressure plate 41. The embodiment shown in Figs. 6 and 7 corresponds to the symmetrical arrangement according to the embodiment of Figs. 4 and 5 with uniform contact members 27d.

In addition to one or two-row terminal connections, also embodiments with three, four and more rows can be produced when care is taken that the clamping force for exerting the contact pressure is uniformly distributed to the contact rows and is sufficiently high to assure a proper current passage. If desired, also a plurality of screw, wedge or similar pressure exerting arrangements may be provided instead of the screw 34, 35 or the pressure frame 40–42 which, however, should be as simple as possible and possibly should have to be actuated at one point only.

All contact members 27, 27a, 27b, 27c, and 27d are so dimensioned that they can selectively be interchanged.

The connection for instance of a cable, to a multi-polar terminal connection is easy to carry out. The contact members 27, 27a, 27b, 27c, and 27d are either soldered or clamped to the individual wires in conformity with the respective requirement and this is effected outside the socket part 21 or plug part 22 of the entire block. The individual contact members 27, 27a, 27b, 27c, and 27d of the thus prepared cable are in a simple manner inserted into the carrier plates 26, 33 or 38 until the locking strips 23 engage the same. In this way the cable or wire is properly connected to the respective part 21, 22 or 37 of the terminal strip connection.

If desired, the casings may be so designed that they can serve as base on which may be connected smaller machine parts or units.

Instead of clamping screws 34 or 42 for producing the contact pressure, also other known clamping and tensioning elements may be employed whereby the time for establishing or interrupting the connection of the multi-polar terminal strip connection may be shortened or the handling thereof may be simplified.

The locking strips 23 will become superfluous if each individual carrier plate such as the plate 26 in Figs. 1 to 3 has a separate locking member for the respective contact members 27 and is suspended in the next locking member in a form-locking manner.

The employment of the threading principle of the individual parts making up the plug or the socket part so as to form a contact block 21, 22 or 37, make it possible by simple means to compose multi-polar terminal strip connections with the desired number of contact points. It should be noted in this connection that all parts remain unchanged with the exception of the locking strips 23 and clamping screws 34 and 42.

It is, of course, understood that the present invention is, by no means, limited to the particular constructions shown in the drawings but also comprises any modifications within the scope of the appended claims. Thus, it is also possible to produce the insulating members of brittle or rigid material, in which instance, however, it is necessary to provide yieldable intermediate layers between the insulating members.

What I claim is:

1. A multi-polar terminal connection for electric circuits, which includes in combination: a plurality of first contact members arranged in spaced relationship with regard to each other and having at least one lateral edge thereof provided with a groove, first insulating members respectively interposed between each two adjacent contact members and having the lateral edges thereof provided with a groove, first latching means arranged to engage with play the grooves of said contact members and of said insulating members, a plurality of second contact members arranged in spaced relationship with regard to each other and having at least one lateral edge thereof provided with a groove, said first and second contact members being substantially identical to each other, second insulating members respectively interposed between said second contact members and having the lateral edges thereof provided with a groove, said first and second insulating members being substantially identical to each other, second latching means arranged to engage with play said second contact members in response to the insertion of said second contact members between the respective adjacent second insulating members, said first and second contact members having their adjacent ends provided with an inclination for automatically and respectively holding said first and second latching means in retracted position prior to said first and second contact members reaching their latched position during the insertion of said first and second contact members respectively between the first and second insulating members pertaining thereto, and clamping means arranged to clamp the adjacent portions of said first and second contact members together for establishing electrical contact therebetween.

2. A multi-polar connector assembly comprising a stack of insulating members formed with spaces extending transversely through the stack from the rear side to the front side, a plurality of contact members each extending through one of said spaces and formed with transverse abutment means, said stack comprising retaining means for maintaining said stack assembled including an element extending between the end insulating members of said stack and movable into and out of position to cooperate with said transverse abutment means to retain said contact members in said spaces, said element having a movable connection to each of the end insulating members and movable engagement with the intermediate members for connecting said members in said assembly in either position of said element, said element being moved out of position on insertion of a contact member, and said retaining means also including means to maintain said element in position to retain said contact members.

3. A multi-polar connector assembly comprising a plurality of contact members and insulating members separating and confining said contact members, retaining means to retain said contact members and insulating members assembled with said contact members arranged successively in a line and with said assembly contractible parallel to said line, each of said contact members having transverse abutment means and being separately insertable in said assembly from one said with a contact end extending to the opposite side, each contact end having a contact surface transverse of said line on one side engageable with the contact surface of a contact member of an interfitting connector, said retaining means including an element movable into and out of position to cooperate with said transverse abutment means to retain said contact members in said spaces, said element having a resilient connection to certain of said insulating members for resiliently maintaining said element in position to retain said contact members and movable out of said position on insertion of one of said contact members and clamping means to contract said structure along a line through the contact surfaces of said assembly and of an interfitting connector to exert pressure on said contact surfaces.

4. A multi-polar connector assembly comprising an insulating structure formed with a plurality of longitudinally alined spaces extending transversely therethrough from the rear side to the front side, a plurality of contact members each insertable in one of said spaces from the rear side and extending through to the front side, each of said contact members having a transverse contact surface on a side at its front end, each of said contact surfaces being engageable with a contact of an interfitting connector, said structure being contractible along a line through said contacts, interengaging latching means on said structure and on each of said contact members positioned on insertion of a contact member to latch said contact member in position in one of said spaces, said latching means comprising an element movably connected to said structure for movement into and out of position to latch all said contact members, and clamping means to exert force to contract said assembly along said line of contacts and exert pressure on the engaging contacts of said assembly and those of an interfitting connector.

5. A multi-polar connector assembly comprising a stack of insluating members formed with spaces extending transversely through the stack from the rear side to the front side, a plurality of contact members each extending through one of said spaces and formed with transverse abutment means, said stack comprising retaining means for maintaining said stack assembled including elements extending longitudinally along the sides of said stack between the end insulating members, each element being transversely movable into and out of position to cooperate with said transverse abutment means of adjacent contact members to retain said contact members in said spaces, each of said elements having a resilient connection to each of the end insulating members and movable engagement with the intermediate members for connecting said members in said assembly in either position of said element, each element being movable transversely out of position on insertion of a contact member and being resiliently returned to retaining position by said resilient connection.

References Cited in the file of this patent

UNITED STATES PATENTS

| | | |
|---|---|---|
| 468,654 | Gibbs | Feb. 9, 1892 |
| 1,865,600 | Welch | July 5, 1932 |
| 1,917,009 | Betts | July 4, 1933 |
| 2,326,327 | Brewer | Aug. 10, 1943 |
| 2,748,364 | Kamm | May 29, 1956 |
| 2,750,572 | Fox | June 12, 1956 |